US012103393B2

(12) United States Patent
Spitzley et al.

(10) Patent No.: US 12,103,393 B2
(45) Date of Patent: Oct. 1, 2024

(54) FLOATING MOUNTING ARRANGEMENT FOR COMPONENTS IN A VEHICLE DISPLAY ASSEMBLY

(71) Applicant: HARMAN INTERNATIONAL INDUSTRIES, INCORPORATED, Stamford, CT (US)

(72) Inventors: Michael Andrew Spitzley, Commerce Twp., MI (US); Daren Harris, Gilbert, AZ (US); Sabin Oana, Howell, MI (US); Matthew Frantz, Ypsilanti, MI (US); Jianing Chen, Northville, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 18/002,496

(22) PCT Filed: Jun. 30, 2020

(86) PCT No.: PCT/US2020/040363
§ 371 (c)(1),
(2) Date: Dec. 20, 2022

(87) PCT Pub. No.: WO2022/005461
PCT Pub. Date: Jan. 6, 2022

(65) Prior Publication Data
US 2023/0226908 A1 Jul. 20, 2023

(51) Int. Cl.
*B60K 35/00* (2024.01)
*B60K 35/22* (2024.01)
(Continued)

(52) U.S. Cl.
CPC ........ *B60K 35/00* (2013.01); *G02F 1/133308* (2013.01); *B60K 35/22* (2024.01);
(Continued)

(58) Field of Classification Search
None
See application file for complete search history.

(56) References Cited

U.S. PATENT DOCUMENTS

2014/0159569 A1* 6/2014 Hwang ................ H10K 59/87
 313/512
2015/0168767 A1* 6/2015 Yonemura ......... G02F 1/133308
 349/58

(Continued)

FOREIGN PATENT DOCUMENTS

CN 110379303 A 10/2019
DE 102013220569 A1 4/2015
(Continued)

OTHER PUBLICATIONS

International Search Report and Written Opinion for Application No. PCT/US2020/040363, dated Feb. 17, 2021, 9 pages.

(Continued)

*Primary Examiner* — Shan Liu
(74) *Attorney, Agent, or Firm* — Brooks Kushman P.C.

(57) ABSTRACT

A display assembly for a vehicle includes a support chassis having a recess, and a display module at least partially received within the recess, the display module having a front side and a back side. A cover lens is attached to the front side of the display module with a bonding material and coupled to the support chassis in a floating mounting arrangement using a flexible adhesive.

16 Claims, 3 Drawing Sheets

(51) Int. Cl.
   *B60K 35/50*   (2024.01)
   *G02F 1/1333*  (2006.01)

(52) U.S. Cl.
   CPC ........ *B60K 35/50* (2024.01); *B60K 2360/816* (2024.01); *G02F 1/133314* (2021.01); *G02F 1/13332* (2021.01)

(56) References Cited

U.S. PATENT DOCUMENTS

| | | | |
|---|---|---|---|
| 2016/0291391 A1* | 10/2016 | Yoshida | G02F 1/133308 |
| 2016/0313597 A1 | 10/2016 | Wedel et al. | |
| 2019/0271874 A1* | 9/2019 | Fu | H10K 77/111 |
| 2022/0248542 A1* | 8/2022 | Hirota | G02F 1/133308 |

FOREIGN PATENT DOCUMENTS

| | | | |
|---|---|---|---|
| EP | 3037871 A1 | | 6/2016 |
| JP | 2016122151 A | | 7/2016 |
| JP | 2017009390 A | * | 1/2017 |
| JP | 2019164275 A | | 9/2019 |

OTHER PUBLICATIONS

International Preliminary Report on Patentability for Application No. PCT/US2020/040363, dated Dec. 13, 2022, 7 pages.

Japanese Office Action with English translation for Application No. 2022-577546 dated Jan. 31, 2024, 7 pages.

Korean Office Action and English translation for Application No. 10-2022-7045780, dated Jun. 27, 2024, 16 pages.

* cited by examiner

FLOATING MOUNTING ARRANGEMENT FOR COMPONENTS IN A VEHICLE DISPLAY ASSEMBLY

CROSS-REFERENCE TO RELATED APPLICATION

This application is the U.S. national phase of PCT Application No. PCT/US2020/040363 filed on Jun. 30, 2020, the disclosure of which is incorporated in its entirety by reference herein.

TECHNICAL FIELD

Embodiments relate to a floating mounting arrangement for components in a vehicle display assembly.

BACKGROUND

In an automotive interior, a vehicle display assembly includes delicate components such as a cover lens, a display module, and the bonding material therebetween. A current approach for attaching a cover lens within a display assembly is to provide screw bosses on the back of the cover lens and drive screws into those bosses to fix the cover lens to a structural reinforcement chassis. One negative side effect to this approach is that forces applied to the structural reinforcement chassis can be transferred to the display module and the bonding material. Such forces can create a display anomaly known as "mura" which is the effect observed when pushing on a display, causing an undesirable color shift or brightness change to the display image. In addition, differences in the coefficient of thermal expansion between the cover lens and the structural reinforcement chassis will result in stresses on these parts. Those stresses could transfer, in turn, to the bonding material which is attached to the display module and can also create display unevenness or inconsistency.

SUMMARY

In one or more embodiments, a display assembly for a vehicle includes a support chassis having a recess, and a display module at least partially received within the recess, the display module having a front side and a back side. A cover lens is attached to the front side of the display module with a bonding material and coupled to the support chassis in a floating mounting arrangement using a flexible adhesive.

In one or more embodiments, a display assembly for a vehicle includes a support chassis having a recess, and a display module at least partially received within the recess without contacting the support chassis, the display module having a front side and a back side. A cover lens is attached to the front side of the display module with a bonding material and coupled to the support chassis in a floating mounting arrangement using a flexible adhesive.

In one or more embodiments, a display assembly for a vehicle includes a support chassis having a recess, and a display module at least partially received within the recess, the display module having a front side and a back side, wherein the back side of the display module is coupled to the support chassis with at least one adhesive member. A cover lens is attached to the front side of the display module with a bonding material and coupled to the support chassis in a floating mounting arrangement using a flexible adhesive.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments disclosed herein offer a solution to the negative effects of rigid assembly features in a display assembly in a vehicle. Instead of using screws or other rigid fasteners and fixtures, a floating mounting arrangement of components within the display assembly is utilized as described below. The floating attachment of the delicate assembly components avoids applying mura-causing forces and/or defect-creating forces within the display assembly.

Figure 1:
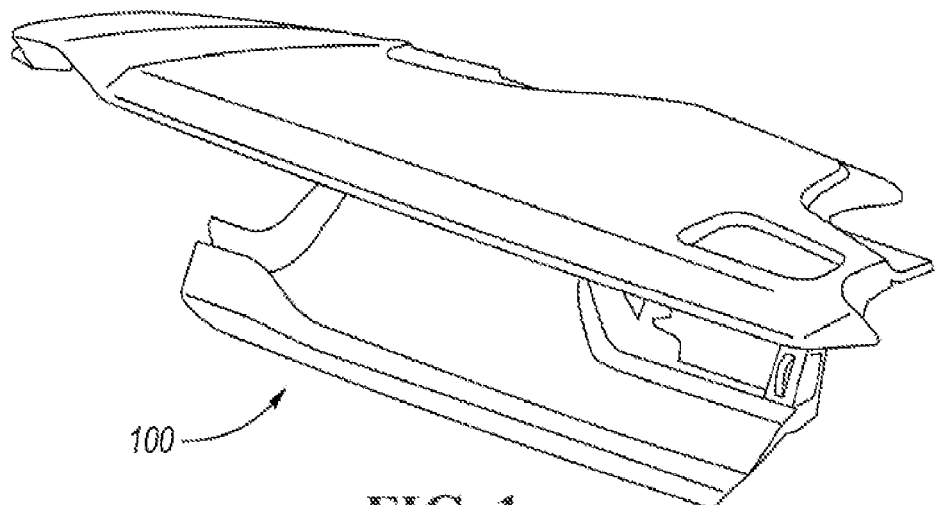
FIG. 1 is an exemplary display assembly installed in a vehicle panel.
Figure 2:
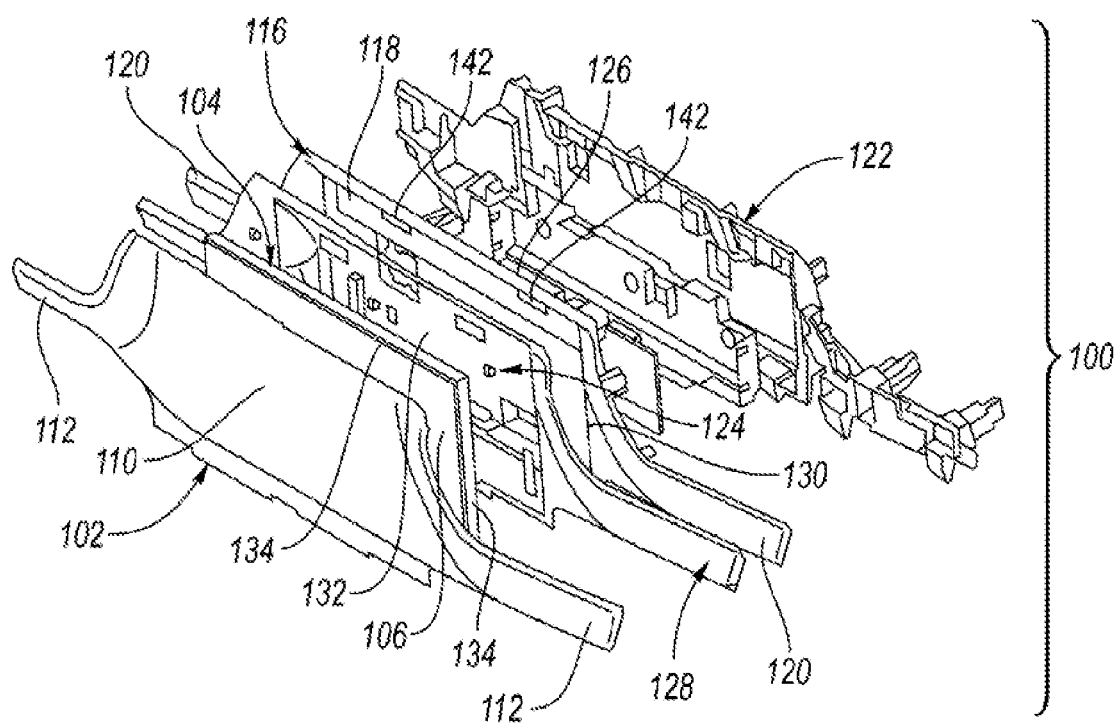
FIG. 2 is a front exploded view of a display assembly according to an embodiment.
Figure 3:
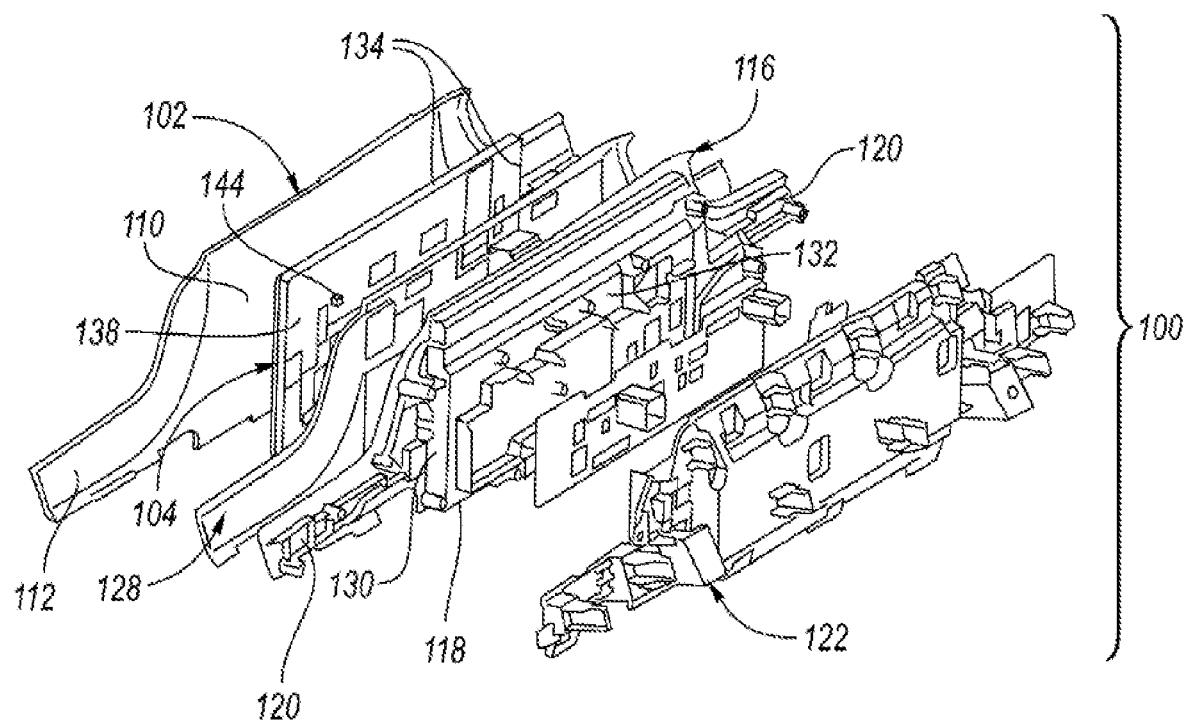
FIG. 3 is a rear exploded view of the display assembly of FIG. 2.
Figure 4:
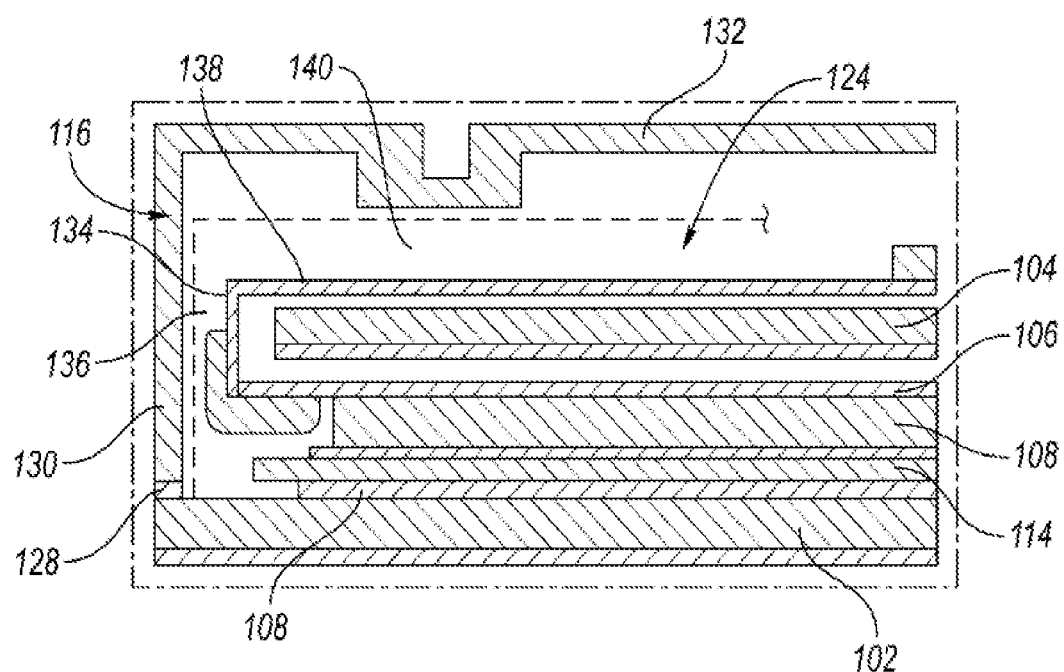
FIG. 4 is a partial cross-sectional view of a display assembly according to an embodiment.

With reference to FIGS. 1-4, according to one or more embodiments, a display assembly 100 for a vehicle includes a cover lens 102 and a display module 104. The cover lens 102 may be attached to a front side 106 of the display module 104 with a bonding material 108, as best shown in FIG. 4. The bonding material 108 may be an optically clear adhesive bonding composition and may be applied in a generally continuous layer of sufficient thickness to secure the cover lens 102 and display module 104 together. In one example, an index-matched high-clarity bonding material may be used between the cover lens 102 and the display module 104, where an index-matched material is a substance having an index of refraction that closely approximates that of another object, such as the cover lens 102. Examples include, but are not limited to, an acrylic- or silicone-based optically clear adhesive that could be applied through methods that create a liquid form or sheet form.

In one or more embodiments, the cover lens 102 may have an elongated configuration, with a generally rectangular central portion 110 arranged to overlie the display module 104, with the central portion 110 tapering to narrower end portions 112 on each side thereof. Of course, this configuration of the cover lens 102 is merely exemplary and is not intended to be limiting. The cover lens 102 may be constructed from a polymer-based material such as, but not limited to, polycarbonate and may be designed with low birefringence. The display module 104 may have a generally rectangular shape and may utilize a touch screen 114 (best shown in FIG. 4).

The display assembly 100 further includes a structural reinforcement or support chassis 116 to which the cover lens 102 and display module 104 are coupled in a floating mounting arrangement, as further described below. Complementary to the cover lens 102, the support chassis 116 may have an elongated configuration, with a generally rectangular central portion 118 which tapers to narrower end portions 120 on each side thereof. The support chassis 116, in turn, may be mounted to a vehicle interface chassis 122 for attachment to a vehicle panel or frame. The support chassis 116 may be constructed from an electrically conductive material such as, but not limited to, cast aluminum or magnesium. As best shown in FIGS. 2 and 4, the central portion 118 of the support chassis 116 includes a recess 124 arranged to at least partially receive the display module 104 when the components of the display assembly 100 are assembled, with a border area 126 surrounding the recess 124.

Instead of prior art screws, fasteners, or other rigid fixation members, a floating attachment is used to couple and mount the cover lens 102 to the support chassis 116 (FIGS. 2-4). In one or more embodiments, the cover lens 102 is attached to the support chassis 116 using a flexible adhesive 128. In particular, a high-elongation, expansion-compliant adhesive may be employed which is capable of absorbing and withstanding dynamic and static loads. As there may be a difference in the coefficient of thermal expansion between the cover lens 102 and the support chassis 116, the adhesive 128 may be selected to ensure that the bond between the cover lens 102 and the support chassis 116 does not break when the display assembly 100 is exposed to varying environmental conditions. In one non-limiting example, Tesa® 7811 double-sided acrylic foam tape may be used as an adhesive 128.

In one or more embodiments, the adhesive 128 may applied so as to substantially surround the display module 104, being applied to substantially cover the border area 126 of the central portion 118 and the end portions 120 of the support chassis 116. In other embodiments, the adhesive 128 may only partially surround the display module 104 while still creating the desired floating mounting arrangement. It is understood that the adhesive 128 could have any shape, size or thickness, and is not limited to the configuration shown and described herein. For example, instead of a generally continuous layer of adhesive 128 as depicted, discrete areas of adhesive 128 could be employed. The surfaces of the cover lens 102 and the support chassis 116 arranged to be in contact with the adhesive 128 may be textured (e.g., ribbed, roughened, etc.) to increase the surface area of the components and thereby enhance the bond strength of the cover lens 102 and the support chassis 116 with the adhesive 128. The support chassis 116 can then be rigidly affixed to a vehicle interface chassis 122 for connection to a vehicle interior panel or other structure.

In addition to eliminating rigid fasteners to secure the cover lens 102 to the support chassis 116, in one or more embodiments the cover lens 102 and the support chassis 116 lack rigid, constraining locating features for assembling these components together. Typically, a combination of a pin on one component and a hole on another component may be used to help guide alignment of the two components with respect to each other during assembly. In the embodiments disclosed herein, this type of locating features may be eliminated so as to avoid creating a rigid fixation and constraint between the cover lens 102 and the support chassis 116 which would prevent the intended floating, flexible bond. Instead, the inherent structural features of the cover lens 102 and the support chassis 116 may be used to guide the assembly of these parts without limiting the flexible bond and floating mount therebetween.

Figure 5:
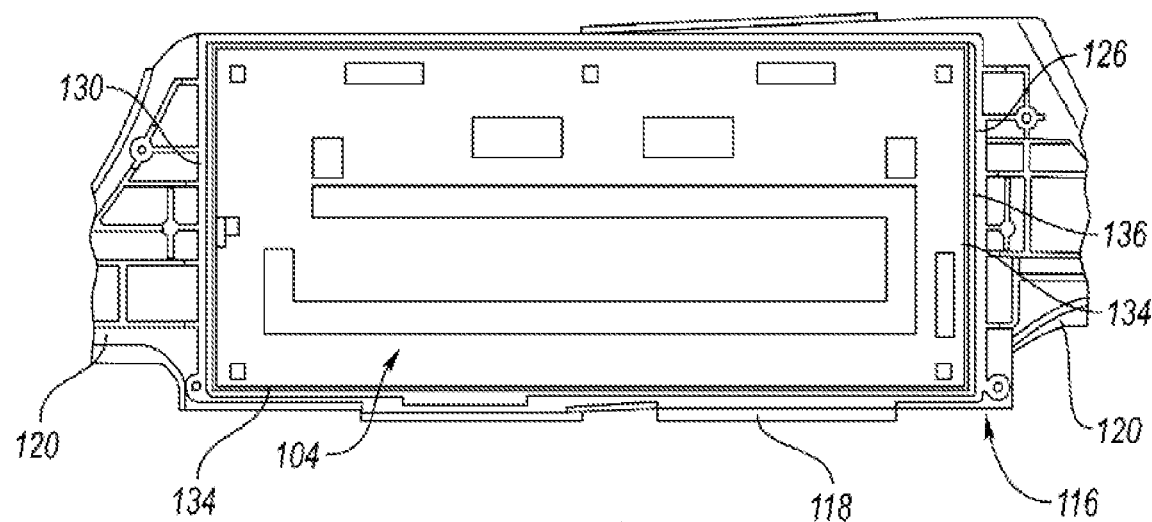
FIG. 5 is a cross-sectional view illustrating the display module and support chassis of a display assembly.

Referring now to FIGS. 4 and 5, the recess 124 of the support chassis 116 is defined by four side walls 130 connected to a rear wall 132. In one or more embodiments, the display module 104 may be arranged to be at least partially received in the recess 124 so as to be adjacent to or surrounded by the side walls 130 and the rear wall 132 without contacting the side walls 130 or the rear wall 132. As illustrated, one, two, three, or all four edges 134 of the display module 104 may be spaced from side walls 130 to form gaps 136. As shown in FIG. 4, a back side 138 of the display module 104 may be spaced from the rear wall 132 to form a gap 140. Since the cover lens 102 is bonded to the display module 104 and the cover lens 102 is adhesively coupled to the support chassis 116, it is not necessary for the display module 104 to be directly connected to the support chassis 116. With this approach, the application of mechanical forces to the display module 104 due to rigid contact with the support chassis 116 is avoided. The display module 104 and the bonding material 108 by which it is connected to the cover lens 102 are therefore isolated and protected from stresses that could generate mura.

In one or more embodiments, at least one adhesive member 142 may be used to couple the back side 138 of the display module 104 with the support chassis 116 along the side walls 130 bordering the recess 124, along the rear wall 132, or both. In the example depicted in FIGS. 2 and 5, a plurality of adhesive members 142 are spaced apart along the rear wall 132 adjacent to the side walls 130. The one or more adhesive members 142 may function to reduce stresses applied to the bonding material 108 as a result of the floating mounting arrangement of the display module 104 in the display assembly 100. It is understood that the at least one adhesive member 142 could have any shape, size or thickness, and is not limited to the configuration or number of adhesive members 142 shown. As described above for the adhesive 128 used to couple the cover lens 102 to the support chassis 116, the at least one adhesive member 142 may be a flexible, high-elongation adhesive which is expansion-compliant and capable of absorbing and withstanding dynamic and static loads.

Figure 6:
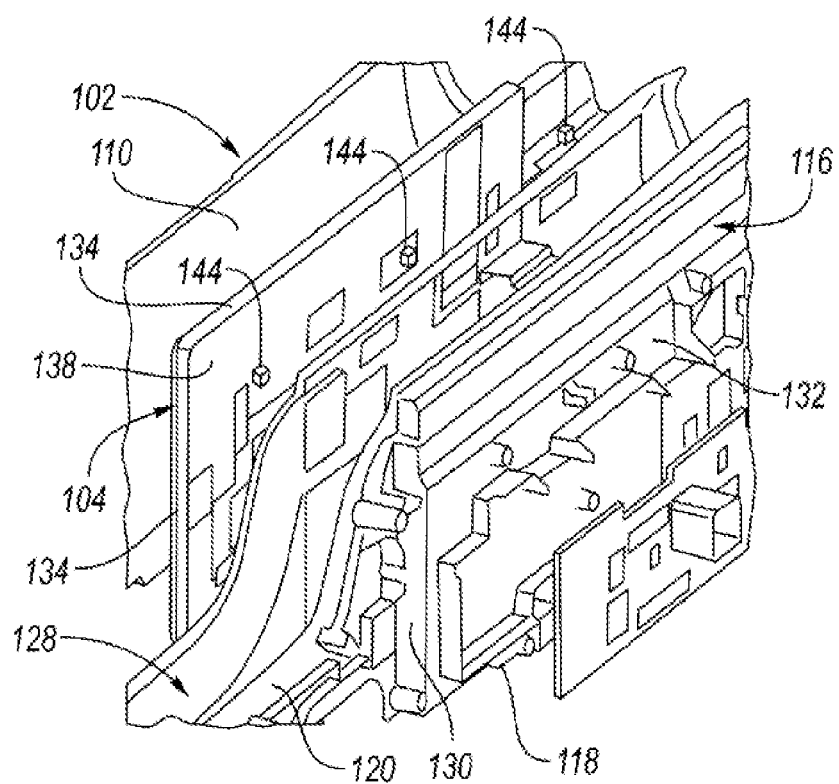
FIG. 6 is an exploded view of a display assembly illustrating compliant ground contacts.

As a result of the floating mounting arrangement of the display module 104 within the display assembly 100, the display module 104 may not have a standard electrical ground contact to the display assembly 100. In order to ground the display module 104 without compromising its floating arrangement within the display assembly 100, embodiments disclosed herein may include at least one compliant ground contact 144 between the support chassis 116 and the display module 104 as illustrated in FIG. 6. The compliant ground contacts 144 may have the form of pads which may be secured with adhesive. In another embodiment, the compliant ground contacts 144 could include a metal spring of any form factor (i.e. coil spring, leaf spring, etc.), where it is desirable for the spring to have a low spring constant so the forces applied to the display module 104 are negligible. The compliant ground contacts 144 can be secured to the display module 104, the support chassis 116, or both. The one or more compliant ground contacts 144 provide electrical contact between the back side 138 of the display module 104 and a portion of the support chassis 116 such as, but not limited to, the rear wall 132 bordering the recess 124.

The trend in the automotive interior industry is towards instrument panels with larger lenses as well as more display solutions requiring index-matched high-clarity bonding material. Embodiments disclosed herein provide a way of bringing the cover lens 102 and display module 104 components together with the support chassis 116 in a way that avoids applying stresses to these delicate components and the bonding material 108, thus preventing mura in the display module 104. Quality defects in the bonding material 108 may also be avoided, such as air bubbles, air gaps, changes in rigidity or flexibility, or delamination. The disclosed embodiments provide a competitive advantage in the category of vehicle display assemblies that include a display module and a cover lens.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display assembly for a vehicle, comprising:
   a support chassis having side walls connected to a rear wall which define a recess and constructed from an electrically conductive material, wherein the support chassis has a generally rectangular central portion which tapers to narrower end portions on each side thereof, the recess located in the central portion and surrounded by a border area;
   a display module at least partially received within the recess, the display module having a front side and a back side; and
   a cover lens attached to the front side of the display module with a bonding material and coupled to the support chassis in a floating mounting arrangement using a flexible adhesive, the flexible adhesive directly attaching the cover lens to the support chassis by substantially surrounding the display module along the border area of the support chassis and overlapping the narrower end portions of the support chassis in a plan view.

2. The display assembly of claim 1, wherein the display module is arranged to be at least partially received in the recess without contacting the support chassis.

3. The display assembly of claim 1, wherein the flexible adhesive includes a high-elongation, expansion-compliant adhesive.

4. The display assembly of claim 1, further comprising at least one adhesive member coupling the back side of the display module with the support chassis.

5. The display assembly of claim 1, further comprising at least one compliant ground contact to provide electrical contact between the support chassis and the display module.

6. The display assembly of claim 1, wherein the cover lens has an elongated configuration with a generally rectangular central portion which tapers to narrower end portions on each side thereof.

7. The display assembly of claim 1, further comprising a vehicle interface chassis to which the support chassis is arranged to be mounted.

8. A display assembly for a vehicle, comprising:
   a support chassis having side walls connected to a rear wall which define a recess, wherein the support chassis has an elongated configuration with a generally rectangular central portion which tapers to narrower end portions on each side thereof, the recess located in the central portion and surrounded by a border area;
   a display module at least partially received within the recess without contacting the support chassis, the display module having a front side and a back side; and
   a cover lens attached to the front side of the display module with a bonding material and coupled to the support chassis in a floating mounting arrangement using a flexible adhesive, the flexible adhesive directly attaching the cover lens to the support chassis by substantially surrounding the display module along the border area of the support chassis and overlapping the narrower end portions of the support chassis in a plan view.

9. The display assembly of claim 8, wherein the flexible adhesive includes a high-elongation, expansion-compliant adhesive.

10. The display assembly of claim 8, further comprising at least one compliant ground contact to provide electrical contact between the support chassis and the display module.

11. The display assembly of claim 8, wherein the cover lens has an elongated configuration with a generally rectangular central portion which tapers to narrower end portions on each side thereof.

12. The display assembly of claim 8, further comprising a vehicle interface chassis to which the support chassis is arranged to be mounted.

13. A display assembly for a vehicle, comprising:
   a support chassis having side walls connected to a rear wall which define a recess and constructed from an electrically conductive material, the support chassis having an elongated configuration with a generally rectangular central portion which tapers to narrower end portions on each side thereof, the recess located in the central portion and surrounded by a border area;
   a display module at least partially received within the recess, the display module having a front side and a back side, wherein the back side of the display module is coupled to the support chassis with at least one adhesive member; and
   a cover lens attached to the front side of the display module with a bonding material and having an elongated configuration with a generally rectangular central portion which tapers to narrower ends portions on either side thereof, the cover lens coupled to the support chassis in a floating mounting arrangement using a flexible adhesive, the flexible adhesive directly attaching the cover lens to the support chassis by substantially surrounding the display module along the border area and overlapping the narrower end portions of the support chassis in a plan view.

14. The display assembly of claim 13, wherein the flexible adhesive includes a high-elongation, expansion-compliant adhesive.

15. The display assembly of claim 13, further comprising at least one compliant ground contact to provide electrical contact between the support chassis and the display module.

16. The display assembly of claim 13, further comprising a vehicle interface chassis to which the support chassis is arranged to be mounted.

* * * * *